United States Patent [19]

Kawamura et al.

[11] Patent Number: 4,953,605
[45] Date of Patent: Sep. 4, 1990

[54] REINFORCING STRUCTURE FOR BEAD PORTION OF RADIAL TIRE FOR HEAVY LOAD

[75] Inventors: Kazuhiko Kawamura, Shirakawa; Kazuo Sato, Kobe, both of Japan

[73] Assignee: Sumitomo Rubber Industries, Ltd., Japan

[21] Appl. No.: 194,900

[22] Filed: May 17, 1988

Related U.S. Application Data

[63] Continuation-in-part of Ser. No. 874,059, Jun. 13, 1986, abandoned.

[30] Foreign Application Priority Data

Jun. 13, 1985 [JP] Japan .................. 60-129301

[51] Int. Cl.⁵ .............................................. B60C 15/06
[52] U.S. Cl. .................................. 152/541; 152/543; 152/546; 152/547; 152/554
[58] Field of Search ................ 152/541, 542, 543, 546, 152/547, 554, 539, 555

[56] References Cited

U.S. PATENT DOCUMENTS

| | | | |
|---|---|---|---|
| 4,227,563 | 10/1980 | Grosch et al. ............... | 152/543 X |
| 4,726,408 | 2/1988 | Alie et al. ..................... | 152/541 |

FOREIGN PATENT DOCUMENTS

| | | | |
|---|---|---|---|
| 206679 | 12/1986 | European Pat. Off. ......... | 152/539 |
| 102604 | 6/1984 | Japan ............................. | 152/546 |
| 2150894 | 7/1985 | United Kingdom ............. | 152/539 |

Primary Examiner—Merrell C. Cashion, Jr.
Assistant Examiner—Geoffrey L. Knable
Attorney, Agent, or Firm—Stevens, Davis, Miller & Mosher

[57] ABSTRACT

A radial tire for heavy loads, comprises: a pair of bead cores; a carcass the ends of which are turned up around the bead cores to form a carcass main part and a carcass turned up part on the axially inside and the outside of the bead core, respectively; a metallic cord reinforcing layer turned up around the bead core to form (a) an outside part extending along the axially outside of the carcass turned up part and (b) an inside part extending along the axially inside of the carcass main part; an outside reinforcing layer of organic fiber cords disposed axially outside the outside part of the metallic cord reinforcing layer; an inside reinforcing layer of organic fiber cords disposed on the axially inside of the carcass main part; a bead apex between the carcass main part and the turned up part extending radially outwardly beyond the radially outer end of the outside reinforcing layer; a rubber chafer disposed outside the outside reinforcing layer; and an inner sidewall disposed between the outside reinforcing layer and the rubber chafer extending radially outwardly beyond the radially outer end of the outside reinforcing layer so as to contact with a buffer of the bead apex.

10 Claims, 5 Drawing Sheets

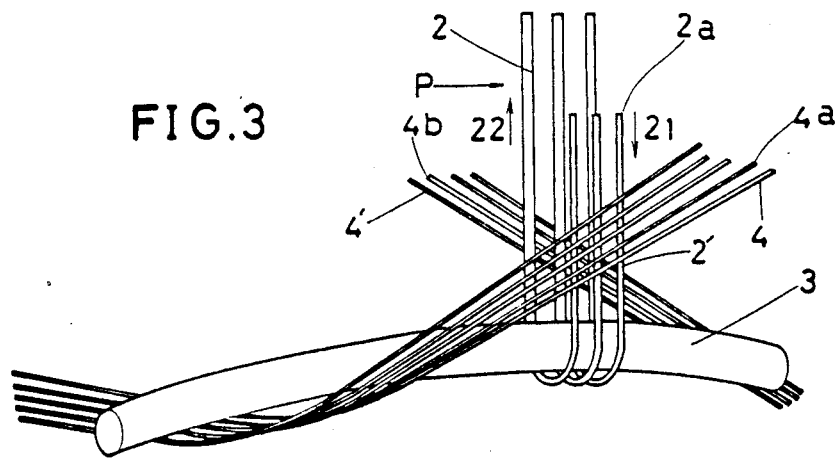
FIG.3
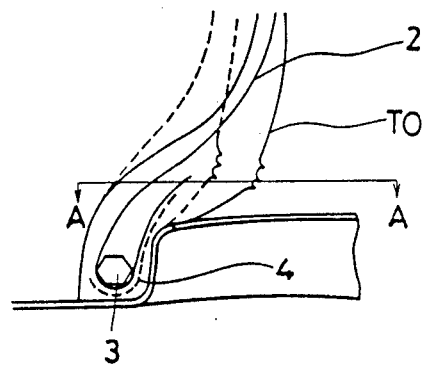
FIG.4
FIG.5
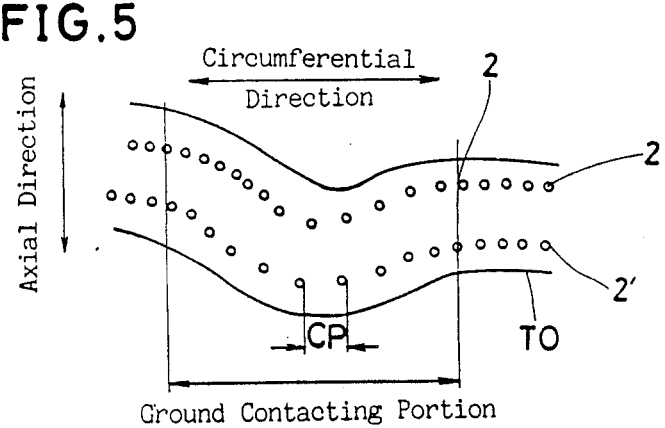

REINFORCING STRUCTURE FOR BEAD PORTION OF RADIAL TIRE FOR HEAVY LOAD

This is a continuation in part of application Ser. No. 874,059 filed Jun. 13, 1986, now abandoned.

BACKGROUND OF THE INVENTION

The present invention relates to a pneumatic radial tire having a carcass ply composed of metallic cords, and more particularly to an improvement of the reinforcing structure for the bead part of a radial tire for heavy loads.

In the pneumatic radial ply tire of which the carcass has a ply of metallic cords arranged radially or semi-radially at an angle of 0 to 30 degrees to a tire radial direction, the stiffness of such carcass construction is soft in comparison with the bias ply tire, and this contributes to the improvement in ride comfort of a radial tire. However, on the other hand, the amount of deformation of the tire during tire revolution is larger than that of a bias ply tire, as a result, the bead section is more prone to structural injury. Thus, there is a weak point that the bead part may be damaged in a short period of time under severe service conditions.

Heretofore, in order to solve the above mentioned technical problem characteristic in radial ply tires, many kinds of reinforced constructions of the bead part have been proposed.

One typical excellent reinforced construction of bead part is, for example, that shown in Japanese Patent No. 967452, wherein the construction, as shown in FIG. 2, is characterized in that:

a carcass ply 2 of radially arranged metallic cords, is turned up around a pair of bead cores 3 from the inside toward the outside thereof;

a metallic cord reinforcing layer 4 composed of at least one layer of metallic cords being crosswise to the carcass ply cords, is disposed on the axially outside of the turned-up parts 2' of the carcass ply 2;

an organic fiber cord reinforcing layer 6 composed of at least two layers of rubberized organic fiber cords, is arranged on the axially outside of the metallic cord reinforcing layer 4;

the organic fiber cords of the reinforcing layer 6 are crosswise to the next layer and crosswise to the metallic cords of the metallic cord reinforcing layer 4; and an apex rubber composed of a stiffener 11 and a buffer 12, is disposed above the bead core 3 between the main part and turned-up part 2' of the carcass ply 2.

The tire constructed as above has been favorably accepted by users as a tire which has largely improved reinforced construction of bead parts, and which can be used under severe and heavy load condition.

However, recently, there has increased the rate of using radial tires in special service conditions such as running under heavy load and high internal air pressure, and further in consequence of the remarkable improvement of highways travelling distances have been considerably increased. Accordingly, some drivers have begun to use tires under more severe conditions such as high speed and long distance running under heavy loads and high internal air pressure. As a result, bead separation failure is sometimes induced, and there has been an increased demand for heavy duty radial tires.

On the other hand, it is regarded as a sales point for steel radial tires to endure twice or thrice use by recapping the worn tire, and in order to substantially reduce the running cost, the rate of using recapped tires tends to increase. Under such circumstances, it is vigorously desired to provide a highly durable reinforced bead construction, which is vital to preserving a base tire.

Considering the bead part of radial tires as a composite construction of rubber and fibers, and taking the movement of the carcass ply in the bead part under loaded running into consideration, when the tire is inflated to a high internal pressure P as shown in FIG. 3, the carcass 2 moves upwardly as shown by an arrow 22, and the turned up part 2' of the carcass 2 moves downwardly as shown by an arrow 21. In the extreme, the carcass 2 may be pulled out from the bead core 3, which is the so-called "ply blowout" phenomenon. The metallic cord reinforcing layer 4 acts to prevent the carcass 2 from "ply blowout" because it is disposed at an angle of 50 to 70 degrees with respect to the carcass ply cords.

Furthermore when the tire is loaded, the shape of the bead part in the ground contacting part of the sidewall changes from the dotted line to the solid line as shown in FIG. 4, and the outside (TO) of the sidewall over the rim flange is subjected to deformation towards the axially outside of the tire. As a result, the cord space (CP) in the turned up part 2' of the carcass 2 is widened as shown in FIG. 5. Similarly an increase in cord spacing occurs in the main part of the carcass 2, too.

The more severe the cord space increasing phenomenon, the more the stress concentration on the rubber at the radially outer end of the turned up part 2', accordingly, a peeling phenomenon occurs earlier and grows to result in bead separation failure.

As described above, the sidewalls of the radial ply tire is soft, and it's flexure in a plane parallel to the rotary axis of the tire is very large. Thus, the amount of deformation of the tire during revolution is larger than that of the bias ply tire.

The organic cord reinforcing layer 6 in the above-mentioned Japanese Patent No. 967452, which is disposed axially outside the metallic cord reinforcing layer 4 and composed of organic cords laid at an angle of 60 to 80 degrees with respect to the carcass ply cords, alleviates the stress concentration at the end 4a thereof, but with regard to the prevention of the above mentioned cord space increasing phenomenon the reinforcement in the bead part is still insufficient.

One prior technique aimed at prevention of the cord space increasing phenomenon is, for example, that shown in UK published Patent Application GB 2150894A, wherein, as shown in FIG. 6, a hard rubber strip (HB) is disposed on the axially outside of the main part of the carcass 2. However this means using rubber is still insufficient in terms of increasing circumferential stiffness of the carcass ply 2.

Further, another prior technique aimed at prevention of the cord space increasing phenomenon is that shown in Japanese Patent Application JP A 60-56608, wherein the construction is characterized in that:

a carcass ply of metallic cords is turned up around a pair of bead cores from the inside toward the outside;

a metallic cord reinforcing layer is disposed on the axially outside of the turned-up parts of the carcass ply;

an organic fiber cord reinforcing layer is disposed on the axially inside of the main part of the carcass, and extends to a bead part along the outside of the metallic cord reinforcing layer to cover the radially inner end of the metallic cord reinforcing layer between the carcass ply and the organic fiber cord reinforcing layer.

Arranging a large number of piles of cords in the bead part is a common way to reinforce the bead part, but a simple increase in the cord ply number results in an increased number of the ends thereof and in the increased stiffness of the cord ends. Accordingly, stress concentration at the cord ends and interlayer stress between the adjacent cord plies are apt to increase, and peeling damage between the cord ends and the rubber and separation between the adjacent plies is sometimes induced. Therefore, the durability of the tire is decreased contrary to desired objectives and the bead parts rather tend to suffer from bead damage.

BRIEF SUMMARY OF THE INVENTION

An object of the present invention is, therefore, to provide a reinforcing structure for the bead part of radial tires for heavy loads which can eliminate these difficult problems which have been encountered with the prior art techniques, namely, durability under increasing severe service conditions and a carcass which can be reused two or three times by recapping.

According to one aspect of the present invention, a radial tire for heavy loads, comprises:
a pair of beads each provided with a bead core;
a carcass ply of metallic cords, the ends of which are turned up around the bead cores from the axially inside to outside thereof to form a carcass main part and a carcass turned up part axially inward and outward of the bead core, respectively;
a metallic cord reinforcing layer turned up around the bead core to form an inside part and an outside part axially inward and outward of the bead core, respectively;
an outside reinforcing layer of organic fiber cords, disposed axially outside the outside part of the metallic cord reinforcing layer;
an inside reinforcing layer of organic fiber cords, disposed on the axially inside of the carcass main part;
a bead apex, disposed between the carcass main part and the carcass turned up part, and extending radially outwardly beyond the radially outer end of the outside reinforcing layer;
a rubber chafer disposed axially outside the outside reinforcing layer; and
an inner sidewall disposed between the outside reinforcing layer and the rubber chafer.

BRIEF DESCRIPTION OF THE DRAWINGS

FIG. 3 is a schematic view showing the dislocating direction of the cords in the bead part when the tire is inflated;

FIG. 4 is a schematic view showing the deformation of the bead part over the rim flange in the ground contacting part of the tire when under load;

FIG. 5 is a schematic view showing an increasing cord space phenomenon at the position A—A in FIG. 4;

DETAILED DESCRIPTION OF THE INVENTION

Figure 1:
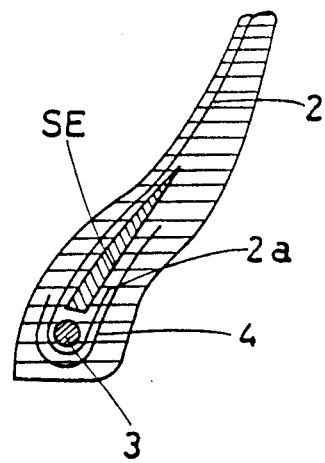
FIG. 1 is a cross-sectional views showing the bead part of a known radial tire having a common bead construction.

The present invention will be now described in detail with reference to the accompanying drawings.

In each of the drawings (FIGS. 7 and 8) of the two embodiments, there is shown a bead of a radial tire for heavy loads which comprises a carcass 2, a bead core 3, a metallic cord reinforcing layer 4, an outside reinforcing layer 6, an inside reinforcing layer 7, a bead apex SE, a rubber chafer 13, an inner sidewall 15, and a ply-filler edge strip 14.

Each bead part is provided with a bead core 3, by which the bead base part thereof is defined as a part surrounding the bead core. The bead base part has a bead base Rb radially inward of the bead core 3.

In the present invention, the term "height" is defined as the perpendicular distance in the radial direction from the bead base Rb to the point concerned.

The carcass 2 has one ply of radial or semi-radial arrangement steel cords, that is, parallel cords laid at an angle of 90 to 60 degrees to the equatorial plane of tire. The carcass extends across the bead parts, and each end thereof is turned up around the bead core from the axially inside to outside thereof to form the carcass main part on the inside of the bead core and the carcass turned up part 2' on the outside of the bead core.

The carcass turned up part 2' extends radially outwardly, and the height h1 of the radially outer end 2a thereof is 0.3 to 0.5 times the height h6 at which the section width of the tire is a maximum when the tire is inflated to the specific air pressure:

$$h1 = (0.3 \text{ to } 0.5)h6.$$

When height h1 is less than 0.3 h6, the rigidity of bead part becomes less, and the resistance of bead part to wear due to friction with the rim also become less. Furthermore, there is a risk of carcass 2 slipping out from bead core 3 if turned up part 2' is too short and the bonding area with other components may also be insufficient.

On the other hand, when height h1 is more than 0.5 h6, outer end 2a extends up to near the radially inner position in the sidewall part of tire at which the flexure is most severe and the difference of rigidity becomes large. Therefore, it provides a nucleus for a crack, and outer end 2a is strongly subjected to separation failure as a result.

Accordingly, the height h1 of the outer end 2a of the turned up part 2' is 0.3 to 0.5 times the height h6.

The value of this choice of construction of the invention is confirmed by measuring of the resistance to the "ply blowout" phenomenon and the "strain in the cord ends".

On the carcass 2, a tread (not shown) and a pair of sidewalls SW are disposed, and a breaker and/or a belt (also not shown) is disposed between the tread and the carcass. Each sidewall SW extends radially inwardly to the bead part.

The above-mentioned metallic cord reinforcing layer 4 has one ply of parallel steel cords, and is turned up around the bead core 3 to form an axially outside part and an axially inside part 4'.

The inside part 4' extends radially outwardly along the axially inside of the carcass main part, and the height h4 of the radially outer end 4b thereof is 0.3 to 0.8 times the height h1 of the outer end 2a of the carcass turned up part 2′:

$$h4=(0.3 \text{ to } 0.8)h1.$$

The outside part extends radially outwardly along the axially outside of the carcass turned up part 2′, and the height h2 of the radially outer end 4a thereof is 0.7 to 0.9 times the height h1 of the outer end 2a of the carcass turned up part 2′:

$$h2=(0.7 \text{ to } 0.9)h1.$$

Figure 2:
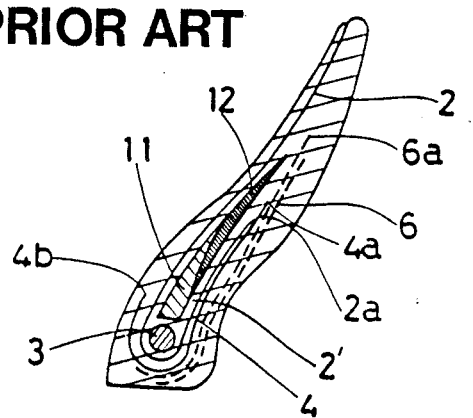
FIG. 2 is a cross-sectional views showing a reinforced bead structure of the prior art tire.
Figure 6:
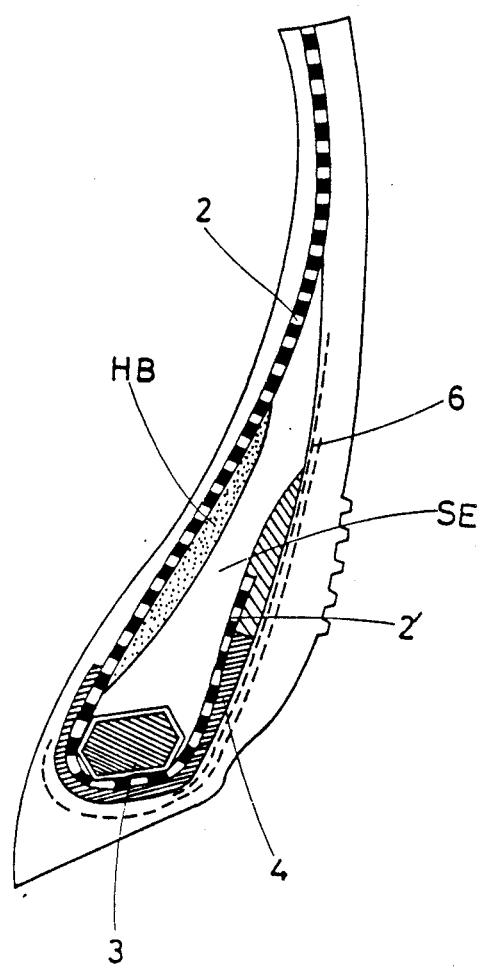
FIG. 6 is a cross-sectional view showing one reinforced bead part according to the prior art.
Figure 7:
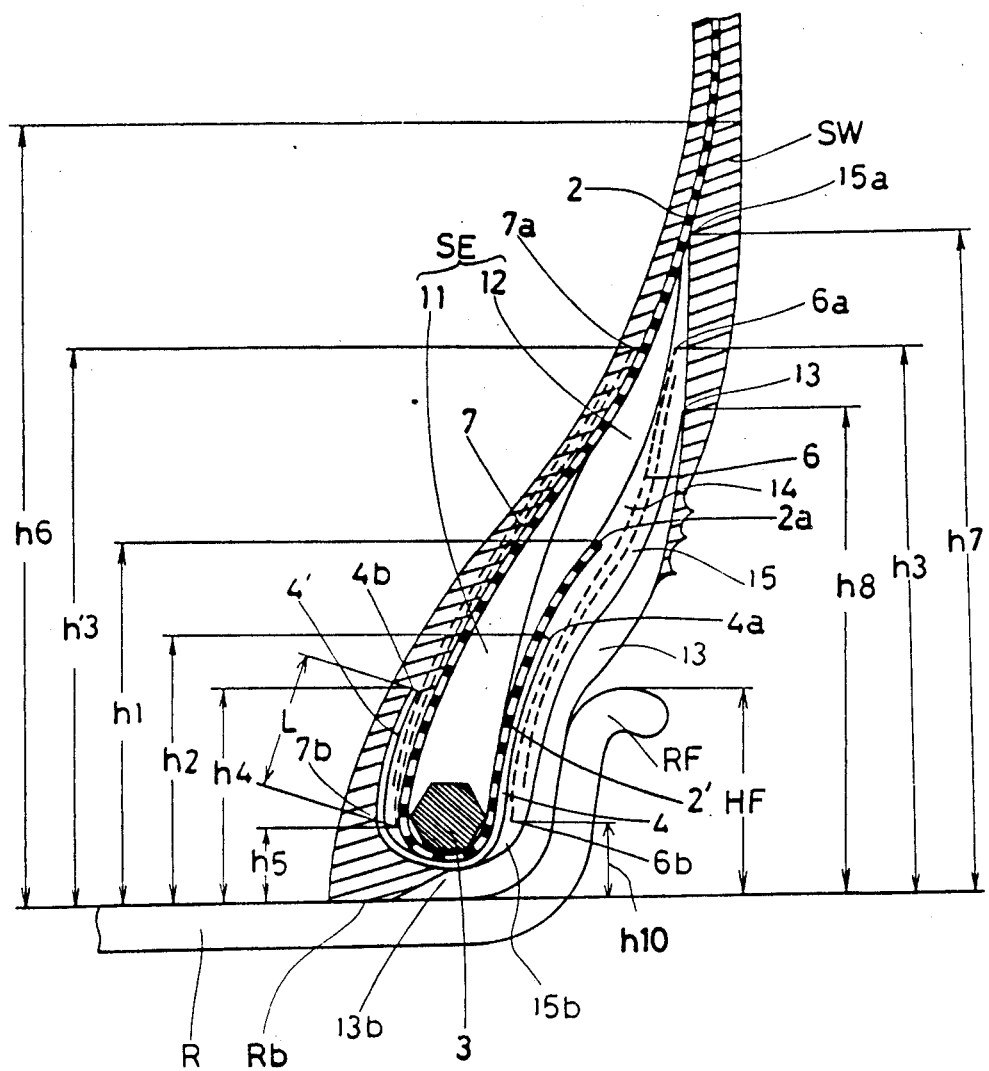
FIGS. 7 and 8 are cross-sectional views each showing a reinforcing structure for the bead part of a radial tire according to the present invention.
Figure 8:
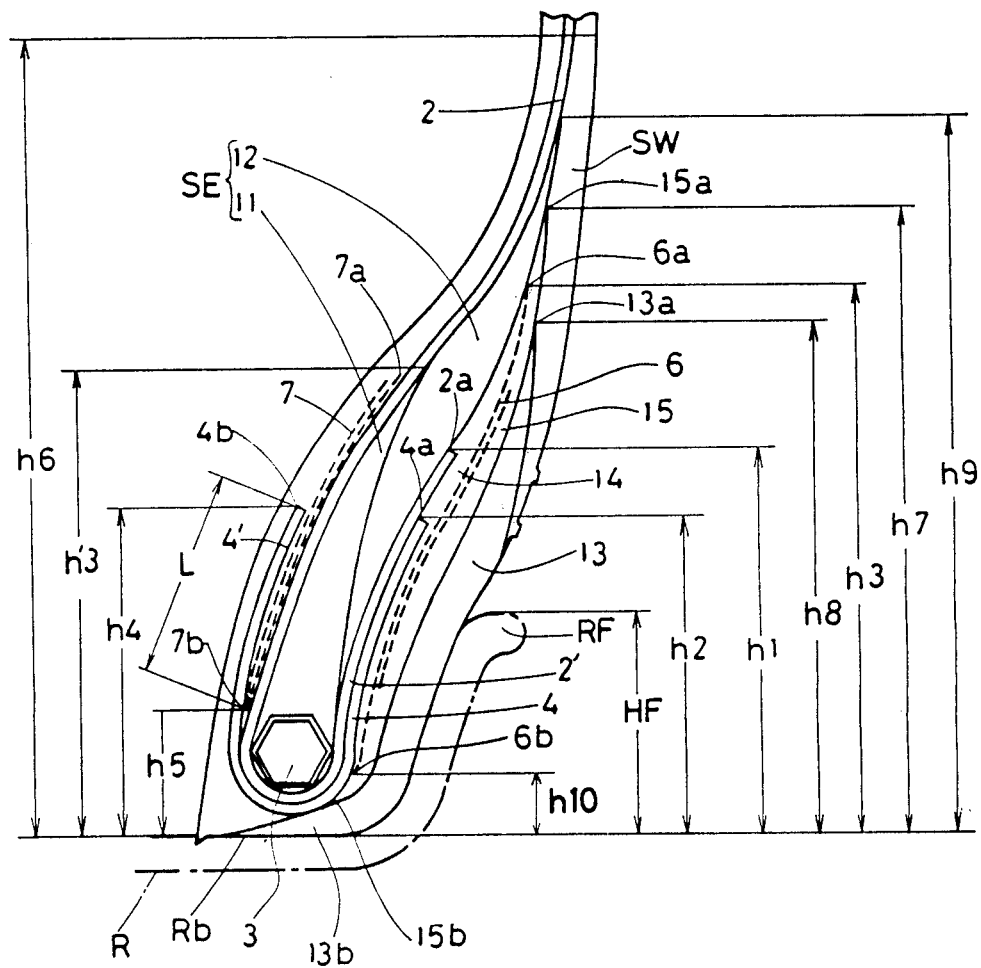

In the conventional bead structure of FIG. 2 in which outer end 4a of metallic cord reinforcing layer 4 is higher than outer end 2a of carcass turned up part 2′, bead failures have frequently occurred at the part at which outer end 4a located. The inventors studied the cause of bead failure at the above mentioned part, and it was confirmed by many experiments that outer end 4a of reinforcing layer 4 functions as a resistant layer having a higher bending resistance than the part from the sidewall to the bead part and resisting the deflection which is repeated at every rotation of the tire in the above mentioned part, as a result, the rubber at outer end 4a is broken down causing cord separation from the rubber, and further, the higher the position of outer end 4a, the earlier the cord separation occurs. Then, it has been found that cord separation failure in the bead part is greatly decreased by making outer end 4a lower than outer end 2a as shown in FIGS. 7 and 8 and the height h2 is 0.7 to 0.9 times the height h1.

When height h2 is smaller than 0.7 h1, the rigidity of bead part also lowers, and the resistance of the bead part to wear due to friction with the rim R and the resistance to case failure under severe loads also lowers.

On the contrary, when height h2 is in a range of 0.9 h1 to 1.0 h1, outer end 4a overlaps with outer end 2a of turned up part 2′, as a result, the stress concentration is doubled thereon, and problems are generated earlier than ever.

The cords of the outside part of the metallic cord reinforcing layer 4 in the position where the height is about h2, incline at a right side upwards angle (for example) of 40 to 80 degrees to the radial direction of the tire (viewing from the outside of the axial direction of the tire). Accordingly, the cords of the inside part 4′ thereof incline at the reverse left side upwards angle of 40 to 80 degrees as shown in FIG. 3.

The above-mentioned outside reinforcing layer 6 comprises two plies of rubberized parallel organic fiber cords, and is disposed on the axially outside of the outside part of the metallic cord reinforcing layer 4.

The outside reinforcing layer 6 extends radially outwardly from a point in the bead base part beyond both the outer end 4a and the outer end 2a, and the height h3 of the radially outer end 6a thereof is 1.3 to 3.0 times the height h1 of the outer end 2a of the carcass turned up part 2′:

$$h3=(1.3 \text{ to } 3.0)h1.$$

Therefore, the outside reinforcing layer 6 reinforces the outside of both the outer end of the carcass turned up part and the outer end of the metallic cord reinforcing layer.

The radially inner end 6b of the outside reinforcing layer 6 is terminated at a point of height h10 axially outward of the bead core 3 to form no turnup.

The above-mentioned inside reinforcing layer 7 comprises at least two plies of rubberized parallel organic fiber cords, and is disposed on the axially inside of the carcass main part.

The reason why the inside reinforcing layer is disposed axially inside the carcass main part is that the heat generated in the bead part is effectively transmitted to the metallic carcass ply cords for radiation.

The radially outer end 7a of the inside reinforcing layer 7 extends to a point radially outward of the outer end 4b of the inside part 4′ of the metallic reinforcing layer 4 in order to prevent the outer end 4b of the inside part 4′ of the metallic cord reinforcing layer 4 from stress concentration.

The radially inner end 7b of the inside reinforcing layer 7 is terminated at a point of height h5 axially inward of the bead core 3 to form no turnup and not to overlap with the radially inner end 6b of the outside reinforcing layer 6 indirectly the metallic cord reinforcing layer between.

Furthermore, the inside reinforcing layer 7 is interposed between the carcass main part and the inside part 4′ of the metallic cord reinforcing layer 4 by a given width L:

$$h5 < h4.$$

The reason why the inside reinforcing layer is interposed between the carcass main part and the inside part 4′ of the metallic cord reinforcing layer, is prevention of the separation therebetween in addition to aid in locking. Such organic fiber cords is lower in rigidity than the metallic cords of the metallic cord reinforcing layer and the carcass ply, and the interposed part thereof eases shearing strain therebetween.

In order to keep the width L of the interposed zone in the suitable range, the height h′3 of the radially outer end 7a of the inside reinforcing layer 7 is preferably 1.25 to 5.0 times the height h4 of the outer end 4b of the outside part 4′ of the metallic cord reinforcing layer 4:

$$h'3=(1.25 \text{ to } 5.0)h4 \text{ or } h4=(0.2 \text{ to } 0.8)h'3.$$

When height h4 is smaller than 0.2 h′3, width L becomes small, and the dispersion of the strain between carcass ply and metallic cord reinforcing layer, and the lateral stiffness of bead part becomes unsatisfactory. On the other hand, when height h4 is larger than 0.8 h′3, the outer end 7a of inside reinforcing layer 7 is located near the outer end 4b of outside part 4′ of metallic cord reinforcing layer 4, which is not preferable.

Furthermore, the height h′3 is 0.5 to 3.0 times the height h1 of the outer end 2a of the carcass turned up part 2′:

$$h'3=(0.5 \text{ to } 3.0)h1.$$

From the standpoint to prevent the outer end 2a of the turned up part 2 from stress concentration and subsequent decrease of the carcass strength, the higher the height h3′, the more preferable it is. However, when height h′3 is over 3.0 h1, such effect as described above becomes constant, and judging from such point of view as weight and cost reduction of tire, the maximum value of the height h′3 was set up to be 3.0 h1. On the contrary, if height h'3 is under 0.5 h1, which leads to the weight and cost reduction of tire, such important effect as to prevent the stress concentration is suddenly reduced, so the lower limit of the height h'3 was set up to be 0.5 h1.

As mentioned above the inside reinforcing layer 7 and the outside reinforcing layer 6 are terminated axially inward and outward of the bead core 3, respectively, and both the height h5 of the inner end 7b and the height h10 of the inner end 6b are not more than 40 mm, more preferably under 30 mm in the radial direction perpendicular from the bead base. This is because (a) this area of the bead base part is the most stable position where the movement and the dynamic strain are small and the stress concentration on the cut ends of cords is very small, (b) if the inside and outside reinforcing layers overlap one another in the bead base part, then the weight of the tire increases, and the volume of the bead part and the heat generation increase, and further the heat radiation through the bead base to the rim R decreases.

Furthermore, there is a more important factor to form the bead part having high rigidity, which is the angle at which to arrange the inside reinforcing layer 7. At the above mentioned height h4, the cords of the axially inside ply of the inside reinforcing layer 7 are laid at right side upwards angle of 30 to 80 degrees, and more preferably 40 to 75 degrees with respect to the cords of the carcass main part, which angle is in the same direction as that of the cords of the inside part of the metallic cord reinforcing layer 4. The cords of each ply are crosswise to the cords of the next ply. Accordingly, the carcass 2 and the inside reinforcing layer 7 make a rigid triangle structure by incorporation of their cords.

The organic fiber cords of the inside and outside reinforcing layers have a high modulus of initial elasticity of 700 to 15000 kgf/sq.mm, more preferably 3000 to 15000 kgf/sq.mm.

By such cord arrangement and high modulus cords the durability of the bead part is further improved, which was confirmed through various fleet tests.

Besides, the cords of the carcass, of the metallic cord reinforcing layer, and of the inside and outside reinforcing layers are rubberized with rubber having an excellent adhesive property and an excellent resistance to boundary fatigue under both static and dynamic conditions.

The above-mentioned bead apex SE is disposed between the carcass main part and the carcass turned up part, and extends radially outwardly from the bead core 3 to a point of height h9 beyond the radially outer end 6a of the outside reinforcing layer 6:

$$h9 > h3.$$

The thickness of the bead apex gradually decreases toward the radially outer end thereof, and the bead apex has accordingly a substantially triangular cross section.

The bead apex SE of FIGS. 7 and 8 is composed of two rubber compounds: a stiffener 11 made of hard rubber and a buffer 12 made of soft rubber. The stiffener 11 is disposed adjacent to the bead core and has a modulus of elasticity of 60 to 150 kgf/sq.cm at 100% elongation and a JIS (A) hardness of over 70 degrees. The buffer 12 is disposed radially outside the stiffener and has a modulus of elasticity of 10 to 45 kgf/sq.cm at 100% elongation and a JIS(A) hardness of 45 to 65 degrees.

By the way, the bead apex is capable of being composed of a single soft rubber compound having a modulus of elasticity of 10 to 45 kgf/sq.cm at 100% elongation and a JIS(A) hardness of 45 to 65 degrees, in this case, the below advantage in the improvement of durability of the bead part is added, as discussed below. That is, according to the invention, the axially inside of the carcass main part is reinforced by the inside reinforcing layer and the metallic cord reinforcing layer, and the deformation of the bead part can be greatly restrained. Accordingly, there is no need to adopt a hard rubber compound as in the prior art, which is apt to induce a high internal temperature rise, for the bead apex in order to hold the high rigidity and to resist the deformation of the bead part which has a close relation with resistance to wear of the bead part due to friction with the rim flange RF. Therefore, it becomes possible for the triangular apex of a single rubber layer to use a soft rubber compound which has a low heat generation property and returns immediately to the original state, absorbing the deformation in the radial and circumferential direction effectively. Also a hard rubber apex can be effectively applied to the reinforcing structure for bead part of the present invention.

The above-mentioned rubber chafer 13 is made of hard rubber having a modulus of elasticity of 50 to 60 kgf/sq.cm at 100% elongation and a JIS (A) hardness of 75 to 85 degrees.

The rubber chafer 13 is disposed axially outside the outside reinforcing layer 6, and extending radially outwardly from the bead base part to a point of height h8.

The height h8 of the radially outer end 13a thereof is 0.65 to 0.8 times the height h7 of the radially outer end 15a of the inner sidewall 15:

$$h8 = (0.65 \text{ to } 0.8)h7.$$

Furthermore, the height h8 is 1.5 to 2.5 times the height HF of the rim flange RF of a wheel rim R for the tire:

$$h8 = (1.5 \text{ to } 2.5)HF.$$

The radially outer part of the rubber chafer is gradually decreased in thickness toward the outer end thereof. As a result, the rubber chafer has a featherlike cross section.

The above-mentioned inner sidewall 15 is made of soft rubber having a modulus of elasticity of 15 to 25 kgf/sq.cm at 100% elongation and a JIS (A) hardness of 55 to 65 degrees, which is softer than the rubber chafer 13, and having a thickness of 0.5 to 2.0 mm.

The inner sidewall is disposed between the outside reinforcing layer 6 and the rubber chafer 13. Therefore, the inner sidewall absorbs the stress between the rubber chafer and the outside reinforcing layer, and the separation therebetween is effectively prevented.

Furthermore, the inner sidewall extends radially inwardly to a point in the bead base part beyond the radially inner end 6b of the outside reinforcing layer 6, and extends radially outwardly to a point of height h7 beyond the radially outer end 6a of the outside reinforcing layer 6 to contact with the bead apex SE:

$$h7 > h3.$$

Accordingly, the outer end 6a of the outside reinforcing layer 6 is covered with the soft rubber (buffer 12) of the bead apex and the inner side wall, and the end 6a is prevented from the stress concentration at every rotation of the tire. As a result, separation failure is further effectively prevented.

Both in FIG. 7 in which the height h7 is slightly larger than the height h9 of the outer end of the bead apex, and in FIG. 8 in which the height h7 is smaller than the height h9 of the outer end of the bead apex, the radially outer part of the inner sidewall 15 and the radially outer part of the rubber chafer 13 are interposed between the bead apex SE and the radially inner part of the sidewall SW.

The above-mentioned ply-filler edge strip 14 is made of hard rubber having a JIS (A) hardness of 60 to 85 degrees, which is harder than the buffer 12 of the bead apex SE.

The ply-filler edge strip 14 is disposed between the carcass turned up part 2' and the outside reinforcing layer 6, and extends radially outwardly from the radially outer end 4a of the outside part of the metallic cord reinforcing layer 4 beyond the radially outer end 2a of the carcass turned up part 2' to a point radially inward of the radially outer end 6a of the outside reinforcing layer 6, whereby the stress concentration on both the outer end 2a of the carcass turned up part 2' and the outer end 4a of the metallic cord reinforcing layer 4 is lessened, and as a result, the separation of cord ply from the adjacent ply and from the rubber is prevented.

As described above, in the present invention, the load of the tire which is transmitted by the carcass ply to the rim flange through the bead cores, is distributed evenly to a wide area, thereby dispersing the stress during the rotation of tire, and the cord space of the carcass ply is prevented from being expanded, and further the internal heat generation in the bead part is restrained to a lower level than that in a conventional tire. As a result, the durability of the bead part is considerably improved, which provide reliable and high security tires being capable of being recapped two or three times.

We claim:

1. A radial tire for heavy loads comprising:
   a pair of bead parts each provided with a bead core and having a bead base part surrounding the bead core, the bead base part having a bead base radially inward of the bead core;
   a carcass extending between the beads and having a ply of metallic cords laid at an angle of 90 to 60 degrees to the equatorial plane of the tire, the ends thereof turned up around the bead cords from the axially inside to outside thereof to form a carcass main part on the inside of the bead core and a carcass turned up part on the outside of the bead core extending radially outwardly;
   a pair of sidewalls on the carcass extending to the bead part;
   a metallic cord reinforcing layer having a ply of metallic cords and turned up around the bead core to form an outside part extending radially outwardly along the axially outside of the carcass turned up part and an inside part extending radially outwardly along the axially inside of the carcass main part;
   an outside reinforcing layer having a ply of organic fiber cords and disposed axially outside from a point (h10) in the bead base part to a point (h3) beyond both the radially outer end of the metallic cord reinforcing layer and the radially outer end of the carcass turned up part;
   an inside reinforcing layer having a ply of organic fiber cords and disposed on the axially inside of the carcass main part, the inside reinforcing layer extending from a point (h'3) radially outward of the radially outer end of the inside part of the metallic reinforcing layer to a point (h5) in the bead base part so as to be interposed between the carcass main part and the inside part of the metallic cord reinforcing layer;
   a bead apex disposed between the carcass main part and the carcass turned up part and extending radially outwardly and decreasing in thickness from the bead core to a point (h9) beyond the radially outer end of the outside reinforcing layer;
   a rubber chafer made of a hard rubber having a modulus of elasticity of 50 to 60 kgf/sq.cm at 100% elongation and a JIS (A) hardness of 75 to 85 and disposed outside the outside reinforcing layer, the rubber chafer extending radially outwardly from the bead base part, the radially outer part thereof gradually decreased in thickness toward the end thereof;
   an inner sidewall made of a soft rubber having a modulus of elasticity of 15 to 25 kgf/sq.cm at 100% elongation and a JIS (A) hardness of 55 to 65 and disposed between the outside reinforcing layer and the rubber chafer,
   the inner sidewall extending radially inwardly to a point in the bead base part beyond the radially inner end of the outside reinforcing layer and further extending radially outwardly to a point (h7) beyond the radially outer end of the outside reinforcing layer so as to contact with the bead apex; and
   the radially outer part of the rubber chafer and the radially outer part of the inner sidewall being interposed between the bead apex and the sidewall.

2. The tire of claim 1, wherein the carcass turned up part, the metallic cord reinforcing layer, the outside reinforcing layer, the inside reinforcing layer, the bead apex, the rubber chafer, and the inner sidewall satisfying the following relation:

$h2 = (0.5 \text{ to } 0.9)h1$, $h3 = (1.3 \text{ to } 3.0)h1$, $h'3 = (0.5 \text{ to } 3.0)h1$, $h7 > h3$, $h8 = (0.65 \text{ to } 0.8)h7$, $h8 = (1.5 \text{ to } 2.5)HF$, $h9 > h3$ where
   h1: the height of the radially outer end of the carcass turned up part
   h2: the height of the radially outer end of the outside part of the metallic cord reinforcing layer
   h3: the height of the radially outer end of the outside reinforcing layer
   h'3: the height of the radially outer end of the inside reinforcing layer h4: the height of the radially outer end of the inside part of the metallic reinforcing layer h7: the height of the radially outer end of the inner sidewall h8: the height of the radially outer end of the rubber chafer h9: the height of the radially outer end of the bead apex HF: the height of the rim flange of a wheel for the tire wherein the height is defined as the perpendicular distance in the radial direction from the bead base to the point concerned.

3. The tire of claim 2, wherein the inside part of the metallic reinforcing layer and the carcass ply turned up part satisfy the following relation:

$$h4 = (0.3 \text{ to } 0.8)h1.$$

4. The tire of claim 1, wherein the inside reinforcing layer and the outside reinforcing layer are terminated axially inward and outward of the bead core, respectively, and both the height (h5) of the radially inner end of the inside reinforcing layer and the height (h10) of the radially inner end of the outside reinforcing layer are not more than 40 mm in the radial direction perpendicular from the bead base.

5. A tire of claim 1, wherein the cords of the inside and outside reinforcing layers each have modulus of initial elasticity of 700 to 15000 kgf/sq.mm.

6. The tire of claim 1, wherein the inside reinforcing layer comprises at least two plies of rubberized parallel organic fiber cords, and the cords of each ply are laid at an angle of 30 to 80 degrees with respect to the cords of the carcass ply.

7. The tire of claim 1, wherein the thickness of the inner sidewall is in a range of 0.5 to 2.0 mm.

8. The tire of claim 1, wherein the bead includes a ply-filler edge strip made of hard rubber having a JIS (A) hardness of 60 to 85 degrees, and the ply-filler edge strip is disposed between the carcass turned up part and the outside reinforcing layer and extends radially outwardly from the radially outer end of the outside part of the metallic cord reinforcing layer beyond the radially outer end of the carcass turned up part to a point radially inward of the radially outer end of the outside reinforcing layer.

9. The tire of claim 1, wherein the bead apex comprises a stiffener made of hard rubber and a buffer made of soft rubber, the stiffener is disposed adjacent to the bead core and has a modulus of elasticity of 60 to 150 kgf/sq.cm at 100% elongation and a JIS (A) hardness of over 70 degrees, and the buffer is disposed radially outside the stiffener so as to contact with the rubber chafer and has a modulus of elasticity of 10 to 45 kgf/sq.cm at 100% elongation and a JIS(A) hardness of 45 to 65 degrees.

10. The tire of claim 1, wherein the bead apex is composed of soft rubber having a modulus of elasticity of 10 to 45 kgf/sq.cm at 100% elongation and a JIS(A) hardness of 45 to 65 degrees.

* * * * *